United States Patent [19]

Stewart et al.

[11] Patent Number: 5,001,826
[45] Date of Patent: Mar. 26, 1991

[54] QUICK CHANGE NOSE PIECE FOR AN AIR-FEED PECK DRILL

[75] Inventors: John F. Stewart; Joseph F. Carter; James A. Maas, all of Lexington, S.C.

[73] Assignee: Cooper Industries, Inc., Houston, Tex.

[21] Appl. No.: 529,786

[22] Filed: May 25, 1990

Related U.S. Application Data

[63] Continuation of Ser. No. 114,955, Oct. 30, 1987, abandoned.

[51] Int. Cl.⁵ .............................................. B23B 45/14
[52] U.S. Cl. ........................................ 29/464; 408/17; 408/72 R; 408/241 G
[58] Field of Search ............ 29/33 K, 464; 76/101 R; 408/14, 16, 17, 110, 112, 115 B, 97, 72 R, 72 B, 133, 137, 138, 202, 241 R, 241 B, 241 G; 409/218; 279/19.6

[56] References Cited

U.S. PATENT DOCUMENTS 2,601,434  6/1952  DuBois ........................ 408/137 X
2,791,922  5/1957  Robinson ..................... 408/137 X
4,507,026  3/1985  Lund ........................ 408/241 G X
4,538,943  9/1985  Clifton et al. .................... 408/14
4,588,334  5/1986  Khurana ..................... 408/241 G X
4,674,927  6/1987  Khurana ..................... 408/241 G X
4,764,060  8/1988  Khurana ........................ 408/14

FOREIGN PATENT DOCUMENTS 2049469  5/1971  Fed. Rep. of Germany ........ 408/97

Primary Examiner—Z. R. Bilinsky
Attorney, Agent, or Firm—Donald J. Verplancken; David A. Rose; Ned L. Conley

[57] ABSTRACT

A nose piece for use with an airfeed drill includes a cylindrical portion which has on one end a truncated cone for mounting a drill support bearing and on the other end a flange. Formed within the flange are a plurality of slots. These slots correspond to an array of rotatable fasteners and locking pieces mounted on the front of the housing. Attachment of the nose piece to the housing is accomplished by placing the slots over the fasteners and locking pieces and tightening the fasteners.

5 Claims, 2 Drawing Sheets

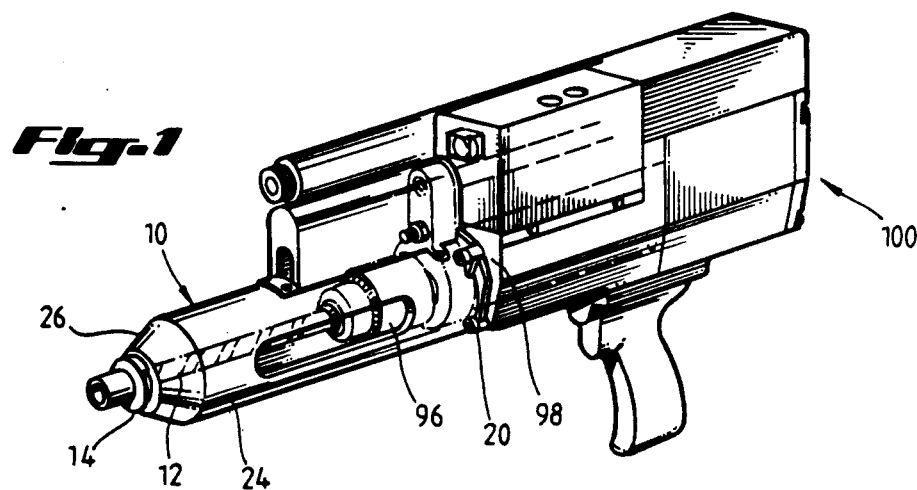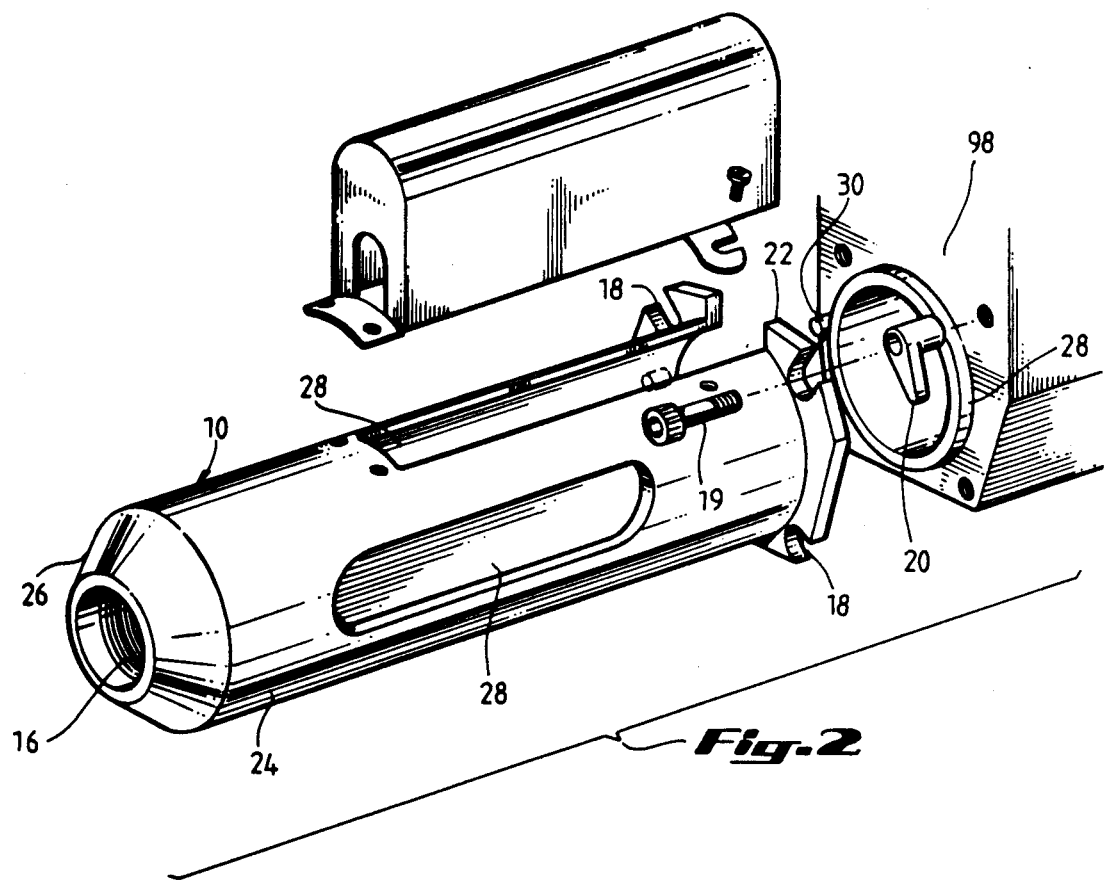

QUICK CHANGE NOSE PIECE FOR AN AIR-FEED PECK DRILL

This is a continuation of copending application Ser. No. 07/114,955 filed on Oct. 30, 1987, now abandoned.

BACKGROUND OF THE INVENTION

The present invention relates to airfeed peck drills more particularly the present invention relates to nose pieces which are used to mount drill bushing tips on the end of airfeed peck drills.

Airfeed peck drills are typically used in the aircraft industry where it is necessary to drill accurate holes with a smooth internal finish. Such results are obtainable with controlled drill feed. Controlled drill feed is accomplished by attaching an air cylinder to the back of an airfeed drill so that air pressure may be used to push against a piston in the air cylinder thus causing the rotating drill to move into the workpiece.

A more sophisticated airfeed drill is an airfeed peck drill. Herein air pressure is used to first push the rotating tool into the workpiece and then fully extract it from the workpiece then repush it into the workpiece then reextract it again. This pecking occurs numerous times over the period of time required to drill a hole. Such pecking operation allows for drilling holes and obtaining accurately sized holes and better internal hole finishes.

One method of mounting airfeed drills to workpieces for drilling holes involves the use of drill bushing tips attached to nose pieces extending from air feed drill housings. The rotating drill passes through the drill bushing tip. In one type of drill bushing tips a cam collar on the outside of the drill bushing tip allows the drill bushing itself to be passed under two cam follower posts attached to a fixture which is attached to the workpiece. This enables the airfeed drill to be properly positioned with respect to the workpiece. Drill bushing tips are commonly marketed by such companies as United Drill Bushing Corp.

Before a hole is drilled, a fixture with cam follower posts is placed over the hole entry point. The air feed drill is then positioned by placing the drill bushing tip between the cam follower posts. The drill is then twisted when the drill bushing tip is located between the cam posts. The cam collar surfaces formed on the outside of the drill bushing tip enable locking of the drill bushing tip to the fixture and thus the drill is positioned with respect to the workpiece.

Housings which mount drill bushings tips have always been a semi-permanent part of the overall tool housing. For rigidity housings have been threadably connected to the drill housing. Changing housings meant partial disassembly of the tool. This operation is time consuming and often requires that the tool be pulled out of production to change housings.

There is therefore a need in the art to provide an airfeed peck drill with nose piece housings which may be removed and replaced in a minimum amount of time.

SUMMARY OF THE INVENTION

The quick change replaceable nose piece of the present invention which mounts on the front of an airfeed drill eliminates the need to disassemble the air feed drill to change housings. The quick change nose piece of the present invention is formed in a substantially cylindrical shape. One end of the cylinder is shaped like a truncated cone for threadable mounting of the drill support bearing tip. On the opposite end of the cylinder is a flange. Formed in the flange are a plurality of slots. The position of each slot corresponds to the position of a plurality of rotatable fasteners with locking pieces which are attached to the housing of the airfeed drill. When the locking pieces are turned, the slots in the flange fit over the locking pieces. After the housing is placed on the front of the airfeed drill, the locking pieces are turned again and the detachable nose piece is attached to the front of the airfeed drill housing by tightening of the rotatable fasteners.

BRIEF DESCRIPTION OF THE DRAWINGS

A better understanding of the nose piece of the present invention may be had by reference to the figures wherein:

FIG. 1 is a perspective view of an airfeed peck drill;

FIG. 2 is an exploded perspective view of the detachable nose piece system of the present invention;

DESCRIPTION OF THE EMBODIMENTS

Figure 5:
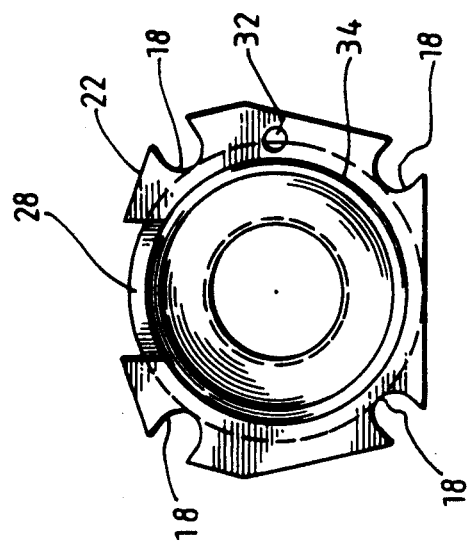
FIG. 5 is an end view taken along line 5—5 of FIG. 3.
Figure 3:
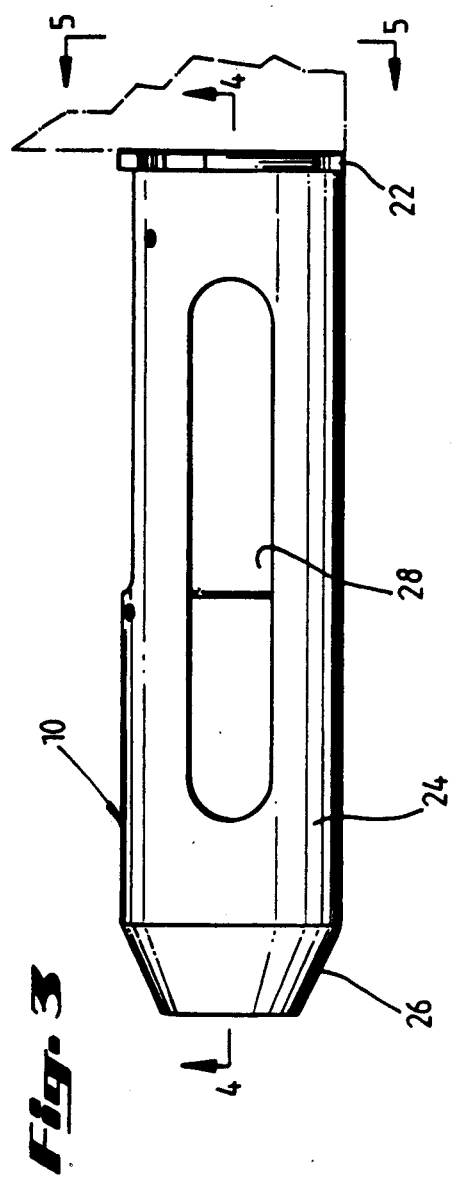
FIG. 3 is an elevational view of the nose piece shown in FIG. 2.
Figure 4:
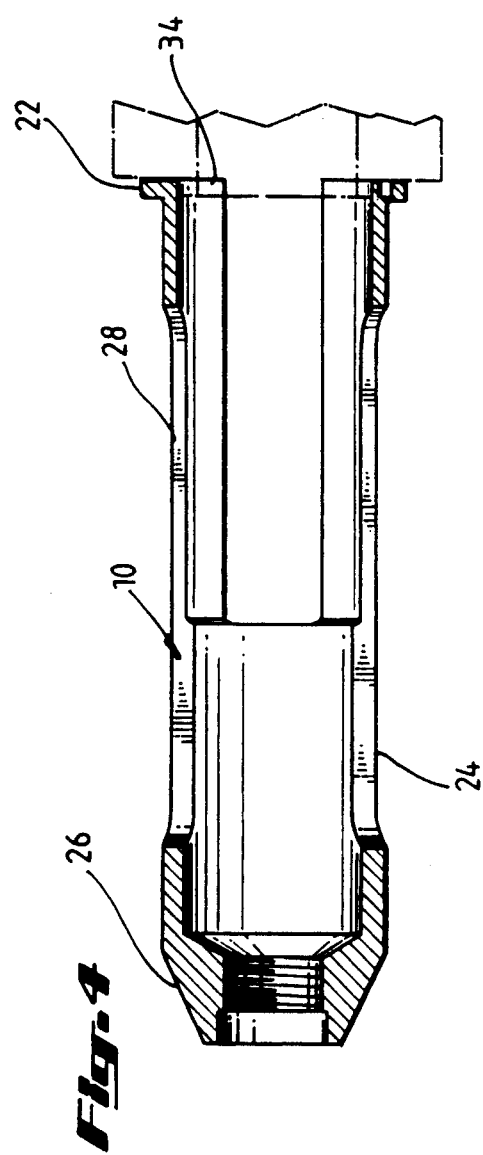
FIG. 4 is a sectional view taken along line 4—4 of FIG. 3.

In FIG. 1 it may be seen that detachable quick change nose piece assembly 10 of the present invention is constructed to attach to the front of an airfeed drill 100. Airfeed drills 100 such as the type used in the present invention are characterized by an operational cycle which involves inserting a drill 12 into a workpiece and moving the drill 12 into the workpiece by air pressure. If desired, drill 100 may be operated in a pecking fashion wherein the tool is inserted and removed from the workpiece numerous times during the drilling of the hole. This frequent removal of rotating drill 12 from the workpiece clears chips from the hole and cools the end of drill bit 12. This removal of chips and the cooling of the end of drill bit 12 results in much better hole accuracy and better surface finishes.

In order to support drill 100 during its movement in and out of the hole being drilled, it is necessary that drill 12 pass through a drill support bearing or bushing 14. Such drill support bushings 14 are often commonly found in airfeed drill mounting systems. Bushings 14 are internally threaded 16 into the front of airfeed drill nose piece housings (see FIG. 2). Nose piece 10 of the present invention is attached to the front 98 of an airfeed peck drill 100. The attachment of nose piece 10 to the front 98 of airfeed peck drill 100 is accomplished by fitting slots 18 over fastener 19 and locking piece 20 combinations which eminate from housing 98 of airfeed drill 100. Aligning nose piece 10 is pilot ring 28 formed on the front of housing 98 and guide pin 30. Pin 30 fits within hole 32. Pilot ring 28 fits in recess 34. Nose piece 10 is attached to airfeed peck drill housing 98 by rotating locking pieces 20 90°. The bottom surfaces of locking pieces 20 press against flange 22 when rotatable fasteners 19 are tightened with a single tool such as an allen wrench. Prior art nose pieces required that the entire be placed in a vise and the nose piece unscrewed with a long bar or wrench. It may be seen that body 24 of nose piece 10 is a cylinder and front 26 of nose piece 10 is a truncated cone. The truncated cone is internally threaded 16 for receiving drill bushing 14. Slots 28 may be formed in nose piece 10 for easy access to drill 12 or chuck 96.

There is thereby provided by nose piece 10 of the present invention a quick method of mounting a drill bushing and nose piece assembly to the front 98 of an airfeed peck drill 100. Quick change nose piece 10 allows for rapid changing of nose pieces using a single and a minimum amount of time.

The foregoing embodiments are intended to illustrate the present invention and not to limit its purpose or scope.

We claim:

1. A method of quickly changing nose pieces on and airfeed peck drill having a housing and a drill bushing tip disposed in the nose piece to guide the drill into the workpiece, the improvement comprising the steps of:
   providing a nose piece having a flange on the end of the nose piece opposite the drill bushing tip;
   providing slots in said flange;
   aligning the nose piece using a pilot ring and guide pin formed on the drill housing;
   passing rotatable fasteners attaching a locking piece having a radial cantilevered portion through the slots into the airfeed peck drill housing; and rotating the locking pieces to place the radial cantilevered portion over the flange to hold the nose piece against the housing.

2. An airfeed peck drill comprising:
   a housing including a front portion constructed and arranged to mount a rotatable portion assembly drill;
   a substantially cylindrical nose piece;
   said noise piece having a flange opposite said front portion said flange including a plurality of slots
   a plurality of rotatable fasteners rotatable locking pieces on said front portion and received within said slots for removably mounting housing to said nose piece
   said locking pieces having a cantilevered portion rotatable into engagement with said flange to bear against said flange and hold said housing to said nose piece whereby said housing may be rapidly mounted to said nose piece
   said fasteners and locking pieces.

3. The airfeed peck drill of claim 2, wherein said flange includes a circumferential slot therein for receiving a circumferential lip projecting from said housing.

4. The nose piece of claim 2, wherein said flange includes a hole for receiving a pilot pin projecting from said housing.

5. An airfeed peck drill, comprising:
   a housing for the drill, said housing having a plurality of threaded apertures disposed around an annular ring projecting from said housing, said housing further having an alignment pin projecting from said housing adjacent said annular ring;
   a generally cylindrical nose piece having a flange on one end thereof, said flange having a plurality of slots adopted for alignment with said apertures, said one end including an arcuate recess adapted for receiving said annular ring and an alignment hole aligned and adapted for receiving said alignment pin;
   a plurality of locking pieces having a cylindrical portion with a cantilever end, said cylindrical portion having a bore therethrough for receiving a threaded fastener adapted for threaded engagement with said threaded apertures for attaching said locking pieces to said housing, said cylindrical portion having a diameter dimensioned to be received within said slots and a length dimensioned so that said cantilever end will bear on said flange upon the tightening of said fasteners in said threaded apertures, said locking pieces being rotatable upon the loosening of said fasteners whereby said cantilever ends may be rotated for alignment with said slots to allow said locking pieces to pass through said slots to remove said nose piece from said housing.

* * * * *

UNITED STATES PATENT AND TRADEMARK OFFICE
CERTIFICATE OF CORRECTION

PATENT NO. : 5,001,826
DATED : March 26, 1991
INVENTOR(S) : John F. Stewart, et al.

It is certified that error appears in the above—identified patent and that said Letters Patent is hereby corrected as shown below:

On the title page, in item [75]:

The name of the inventor should be --James A. Maass--.

Signed and Sealed this

Third Day of November, 1992

Attest:

DOUGLAS B. COMER

*Attesting Officer*  *Acting Commissioner of Patents and Trademarks*